United States Patent [19]

Henson et al.

[11] Patent Number: 5,414,818
[45] Date of Patent: May 9, 1995

[54] METHOD AND APPARATUS FOR CONTROLLING RESELECTION OF A BUS BY OVERRIDING A PRIORITIZATION PROTOCOL

[75] Inventors: Larry P. Henson, Santa Clara; Kumar Gajjar, San Jose; Thomas E. Idleman, Santa Clara, all of Calif.

[73] Assignee: MTI Technology Corporation, Anaheim, Calif.

[21] Appl. No.: 505,746

[22] Filed: Apr. 6, 1990

[51] Int. Cl.$^6$ ............................................. G06F 13/42
[52] U.S. Cl. ............................. 395/325; 364/DIG. 2; 364/940.81; 364/937; 364/935.4; 364/941; 364/941.8
[58] Field of Search ..................... 395/325, 275, 725

[56] References Cited

U.S. PATENT DOCUMENTS

| | | | |
|---|---|---|---|
| 3,303,482 | 2/1967 | Jenkins . | |
| 3,544,777 | 12/1970 | Winkler . | |
| 3,693,159 | 9/1972 | Hilberg . | |
| 3,772,652 | 11/1973 | Hilberg . | |
| 3,803,560 | 4/1974 | DeVoy et al. . | |
| 3,905,023 | 9/1975 | Perpiglia . | |
| 3,917,933 | 11/1975 | Scheuneman et al. . | |
| 3,983,540 | 9/1976 | Keller et al. | 364/200 |
| 4,093,985 | 6/1978 | Das . | |
| 4,096,569 | 6/1978 | Barlow | 364/200 |
| 4,257,095 | 3/1981 | Nadir | 364/200 |
| 4,281,380 | 7/1981 | DeMesa, III et al. | 364/200 |
| 4,339,804 | 7/1982 | Davison et al. . | |
| 4,464,747 | 8/1984 | Groudan . | |
| 4,467,421 | 8/1984 | White . | |
| 4,468,731 | 8/1984 | Johnson et al. . | |
| 4,507,730 | 3/1985 | Johnson et al. . | |
| 4,642,761 | 2/1987 | Yanagiuchi et al. | 395/275 |
| 4,667,326 | 5/1987 | Young et al. . | |
| 4,722,085 | 1/1988 | Flora et al. . | |
| 4,761,785 | 8/1988 | Clark et al. . | |
| 4,768,193 | 8/1988 | Takamae . | |
| 4,817,035 | 3/1989 | Timsit . | |
| 4,825,403 | 4/1989 | Gershenson et al. . | |
| 4,849,929 | 7/1989 | Timsit . | |
| 4,864,291 | 9/1989 | Korpi | 395/325 |
| 4,864,532 | 9/1989 | Reeve et al. | 395/250 |
| 4,914,656 | 4/1990 | Dunphy et al. . | |
| 5,150,467 | 9/1992 | Hayes et al. | 395/325 |
| 5,204,951 | 4/1993 | Keener et al. | 395/325 |

FOREIGN PATENT DOCUMENTS 266789 of 0000 European Pat. Off. .

(List continued on next page.)

OTHER PUBLICATIONS

Blum, "Fast Access Disk File with Several Parallel Heads", IBM Technical Disclosure Bulletin, vol. 25, No. 6, Nov. 1982.

(List continued on next page.)

*Primary Examiner*—Kevin A. Kriess
*Attorney, Agent, or Firm*—Townsend and Townsend Khourie and Crew

[57] ABSTRACT

The present invention provides a method and apparatus for dynamically modifying the priority of access to a bus, where the bus has control and arbitration functions distributed among the devices coupled to the bus, with each device having a fixed priority level. Access to the bus by particular devices is selectively inhibited, preventing them from asserting their fixed priority level. In a preferred embodiment, the present invention provides control over the reselection of a SCSI bus by a plurality of SCSI devices coupled to the bus by providing a pseudo busy signal to SCSI devices from which reselection is not desired. In this fashion, an initiator may issue a plurality of commands to the SCSI devices and control the order in which the devices will be serviced when ready. A plurality of pseudo busy circuits are provided, with one coupled to each device on the bus. Each pseudo busy circuit is controlled by a control signal from the initiator. The pseudo busy circuit intercepts the busy line of the SCSI bus and provides a pseudo busy signal to the busy line input of the device when instructed by the initiator; although this requires additional control lines in conjunction with the SCSI bus, it allows the use of standard peripherals connectors and controllers designed for the SCSI bus.

4 Claims, 4 Drawing Sheets

FOREIGN PATENT DOCUMENTS

| | | |
|---|---|---|
| 369707 | of 0000 | European Pat. Off. . |
| 58-83400 | of 0000 | Japan . |
| 56-88549 | of 0000 | Japan . |
| 56-94593 | of 0000 | Japan . |
| 61-99999 | of 0000 | Japan . |
| 57-111890 | of 0000 | Japan . |
| 57-111893 | of 0000 | Japan . |
| 60-156152 | of 0000 | Japan . |
| 56-163596 | of 0000 | Japan . |
| 57-169297 | of 0000 | Japan . |
| 57-195397 | of 0000 | Japan . |
| 1233087 | of 0000 | United Kingdom . |
| 1497680 | of 0000 | United Kingdom . |

OTHER PUBLICATIONS

W. Jilke, "Disk Array Mass Storage Systems: The New Opportunity," Amperif Corporation, Sep. 30, 1986.

W. Jilke, "Economics Study of Disk Array Mass Storage Systems: The Cost Reduction Opportunity," Amperif Corporation, Mar. 24, 1987.

Michelle Y. Kim, "Synchronized Disk Interleaving," IEEE Transactions on Computers, vol. C-35 No. 11, Nov. 1986.

D. Lieberman, "SCSI-2 Controller Board Builds Parallel Disk Drive Arrays," Computer Design, vol. 28, No. 7, Apr. 1, 1989, pp. 32, 36.

W. Meador, "Disk Array Systems," Spring Compcon 89 Digest of Papers, IEEE Computer Society Press, pp. 143–146.

T. Olson, "Disk array Performance in a Random IO Environment," Computer Architecture, vol. 17, No. 5, Sep. 1989, pp. 71–77.

D. Patterson et al., "A Case for Redundant Arrays of Inexpensive Disks (RAID)," Report No. UCB/CSD 87/391, Dec. 1987.

Product Description, Micropolis 1804 SCSI Parallel Drive Array, Document No. 108120 Rev A.

Program Summary, DataStorage 86, An International Forum, Sep. 22–24, 1986, Red Lion Inn, San Jose, Calif.

H. Sierra, "Assessing the Promise of Disk Arrays," Canadian Datasystems, May 1989, pp. 52–53.

D. Simpson, "RAIDs vs. SLEDs." Systems Integration, Nov. 1989, pp. 70–82.

Mike Sisley, "Microprogram Development Technique Adds Flexibility," New Electronics, vol. 17, No. 23 Nov. 27, 1984, pp. 35–38.

J. Voelker, "Winchester Disks Reach for a Gigabyte," IEEE Spectrum, Feb. 1987, pp. 64–67.

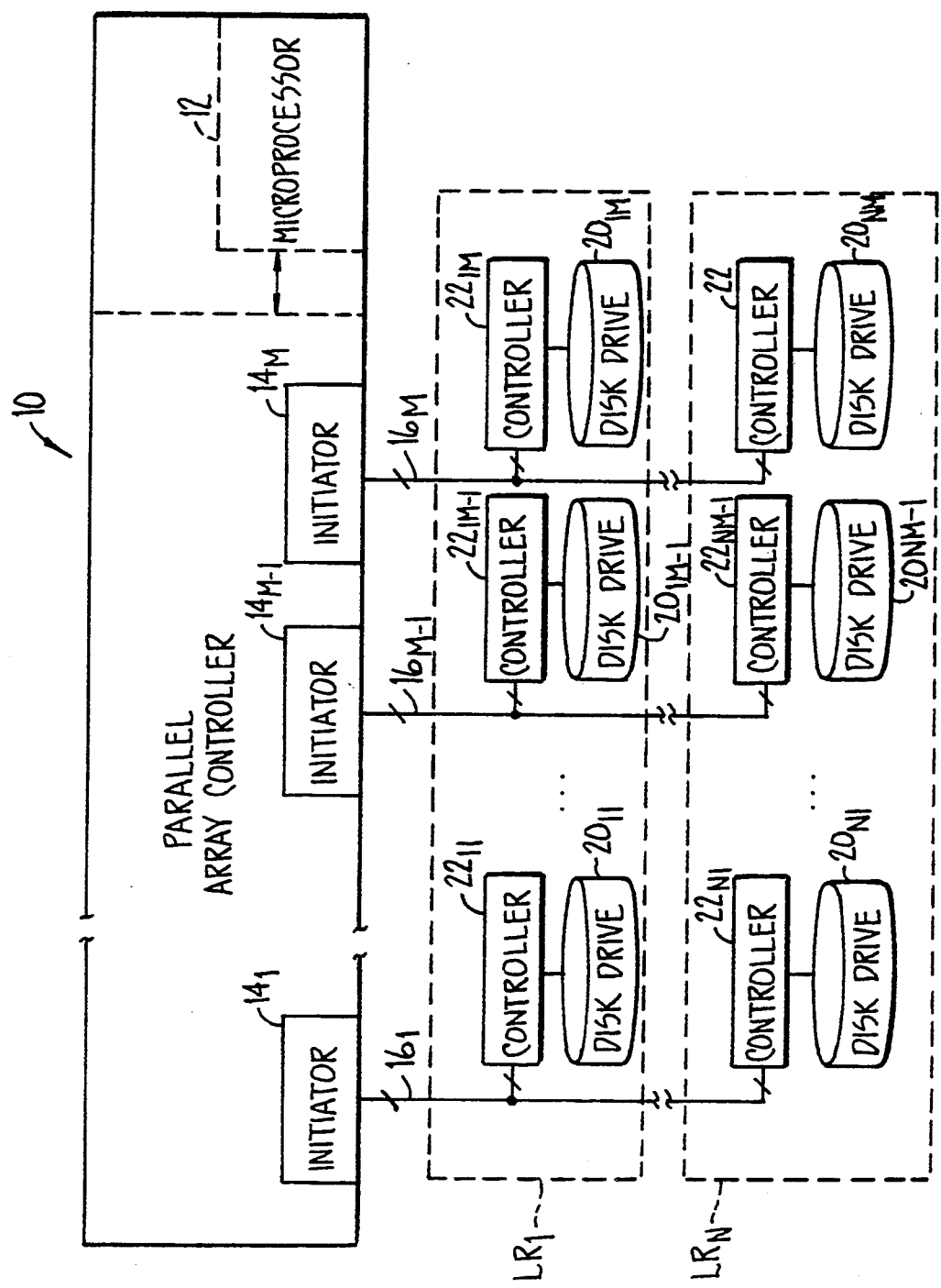
FIG._1.

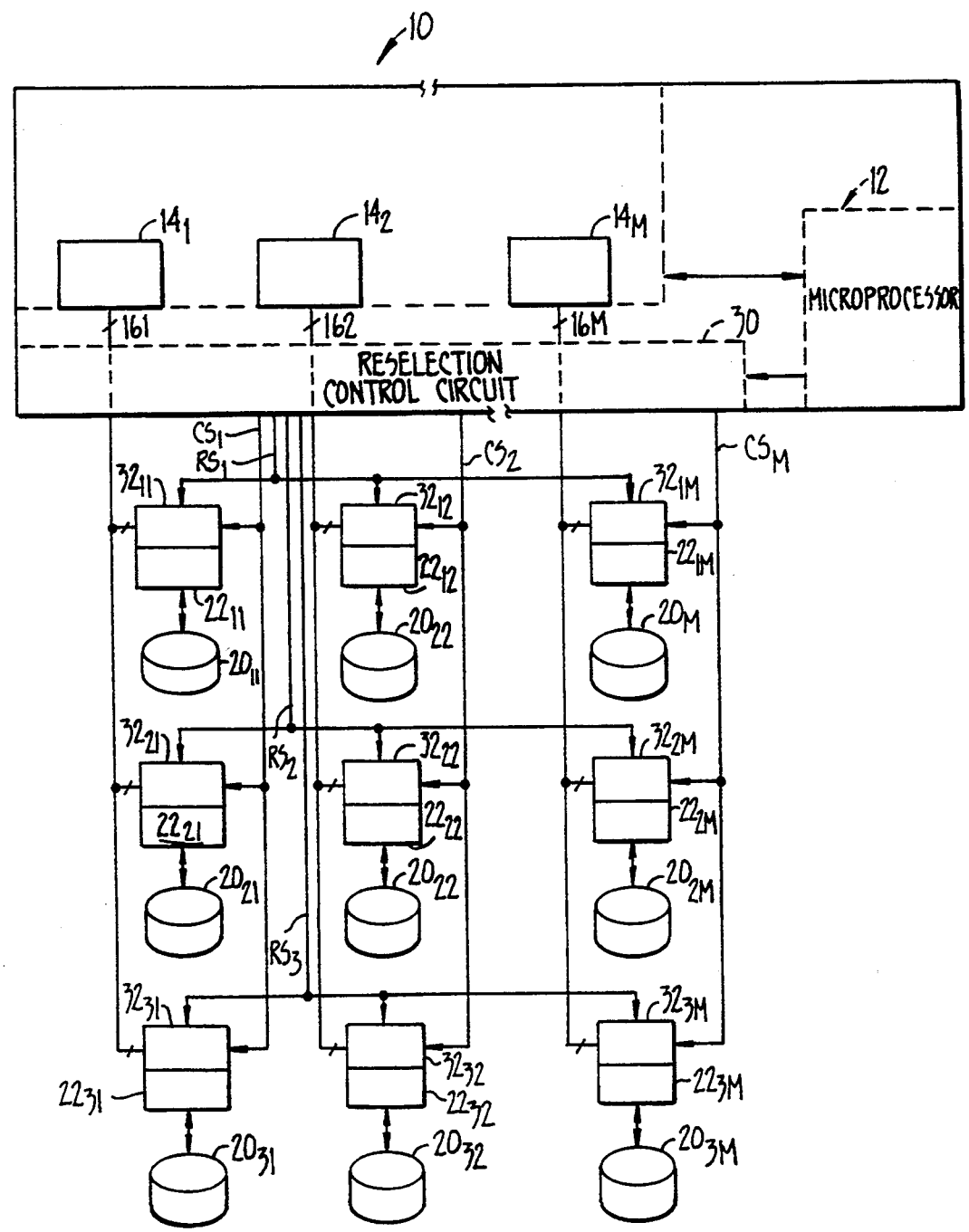
FIG._2.

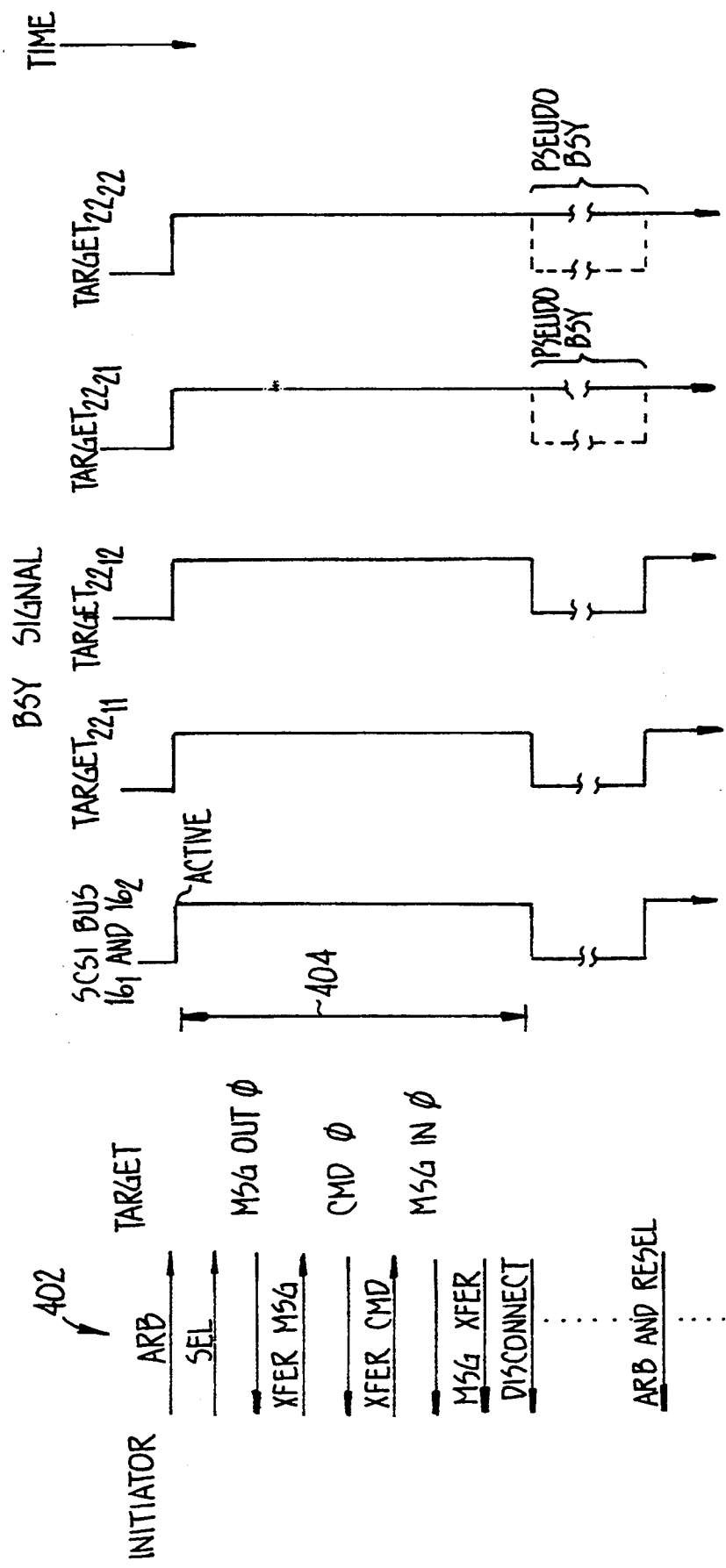
FIG._4.

METHOD AND APPARATUS FOR CONTROLLING RESELECTION OF A BUS BY OVERRIDING A PRIORITIZATION PROTOCOL

BACKGROUND OF THE INVENTION

The present invention relates generally to control of a prioritization protocol to dynamically change a priority of a device. More specifically, this invention relates to selective control of a plurality of devices organized in a logical matrix and operated under a small computer system interface ("SCSI") type protocol. SCSI is described in a publication of the American National Standard For Information Processing ("ANSI"), described in ANSI document No. X3.130-1986.

SCSI has been employed as a local I/O bus for providing a system computer, for example, with peripheral device independence for a class of devices. A variety of mass storage devices (such as disk drives, tape drives, optical drives, and memory caches), printers, microprocessors, protocol translators (such as a modem) and other devices can be added to a computer system without modification to system hardware or software. In addition, special features and functions of individual devices can be handled through use of device-independent fields and codes.

SCSI provides for a plurality of devices to share a local bus, wherein at least one of the devices is denominated an "initiator" which supervises activity on the bus. Each device obtains bus control upon successful arbitration. A SCSI type local bus is one in which the SCSI prioritization protocol is manifested when the determination of access to the local bus during arbitration is based upon a fixed ID of an arbitrating device.

SUMMARY OF THE INVENTION

The present invention provides a method and apparatus for dynamically modifying the priority of access to a bus, where the bus has control and arbitration functions distributed among the devices coupled to the bus, with each device having a fixed priority level. Access to the bus by particular devices is selectively inhibited, preventing them from asserting their fixed priority level.

In a preferred embodiment, the present invention provides control over the reselection of a SCSI bus by a plurality of SCSI devices coupled to the bus by providing a pseudo busy signal to SCSI devices from which reselection is not desired. In this fashion, an initiator may issue a plurality of commands to the SCSI devices and control the order in which the devices will be serviced when ready.

A plurality of pseudo busy circuits are provided, with one coupled to each device on the bus. Each pseudo busy circuit is controlled by a control signal from a reselection control circuit. The pseudo busy circuit intercepts the busy line of the SCSI bus and provides a pseudo busy signal to the busy line input of the device when instructed by the reselection control circuit, although this requires additional control lines in conjunction with the SCSI bus, it allows the use of standard peripherals, connectors and controllers designed for the SCSI bus.

In one embodiment, the method and apparatus of the present invention is effectively used to control access to a matrix of SCSI devices arranged in multiple rows and columns. A separate initiator is used for each column and communicates with the SCSI devices on that column by use of a SCSI bus, wherein an assertion of a BSY signal to a target inhibits that target from attempting to reselect an initiator when it is ready in response to a previously issued command.

A reselection control circuit is used for selectively asserting pseudo busy control signals in the form of row select signals and column select signals. This provides flexibility in allowing selection of either a row, a column, or a subset of a row (by selecting the row and multiple columns in that row). Coupled to each disk drive is a pseudo busy circuit responsive to its respective row select signal and column select signal for providing a pseudo busy signal to its disk drive.

The invention efficiently and economically provides an apparatus to ensure that undesired disk drives, which otherwise are independently operable to reselect a data bus line, are temporarily inhibited by a pseudo busy signal to prevent an attempt to reselect an initiator on the data bus. Only desired disk drives of a particular row subset will attempt to access their respective SCSI bus, permitting access to the initiator as soon as the drive is ready. Thus, a maximization of data flow is provided and an improved network bandwidth is obtained.

The SCSI prioritization protocol inherently promotes an imbalance between access times among the various targets on a single SCSI bus. This imbalance results from high priority devices winning arbitrations over lower priority devices. By selective control over each device's reselection of a particular SCSI bus, this access time imbalance may be reduced or altered in any particular fashion. In certain implementations, it may be desirable to promote an imbalance in access times. These implementations may include those times when a particular device has a forecasted work queue which is larger than other devices on a particular SCSI bus. The device with the larger queue may be given a greater priority access to the initiator to permit it to process the larger amount of work thereby skewing the access time imbalance. A microprocessor may be responsible for establishing and monitoring a work queue for the various devices.

A further understanding of the nature and advantages of the invention may be realized by reference to the remaining portions of the specifications and the drawings.

BRIEF DESCRIPTION OF THE DRAWINGS

FIG. 1 is a schematic block diagram of a parallel array controller 10 using a plurality of disk drive units $20_{ij}$ arranged in a matrix;

FIG. 2 is a schematic block diagram illustrating a preferred embodiment of the present invention;

FIG. 4 is a timing chart illustrating operation of a 2×2 matrix of SCSI type devices implementing an embodiment of the present invention as illustrated in FIG. 2.

DESCRIPTION OF THE PREFERRED EMBODIMENT

Figures 3A, 3B:
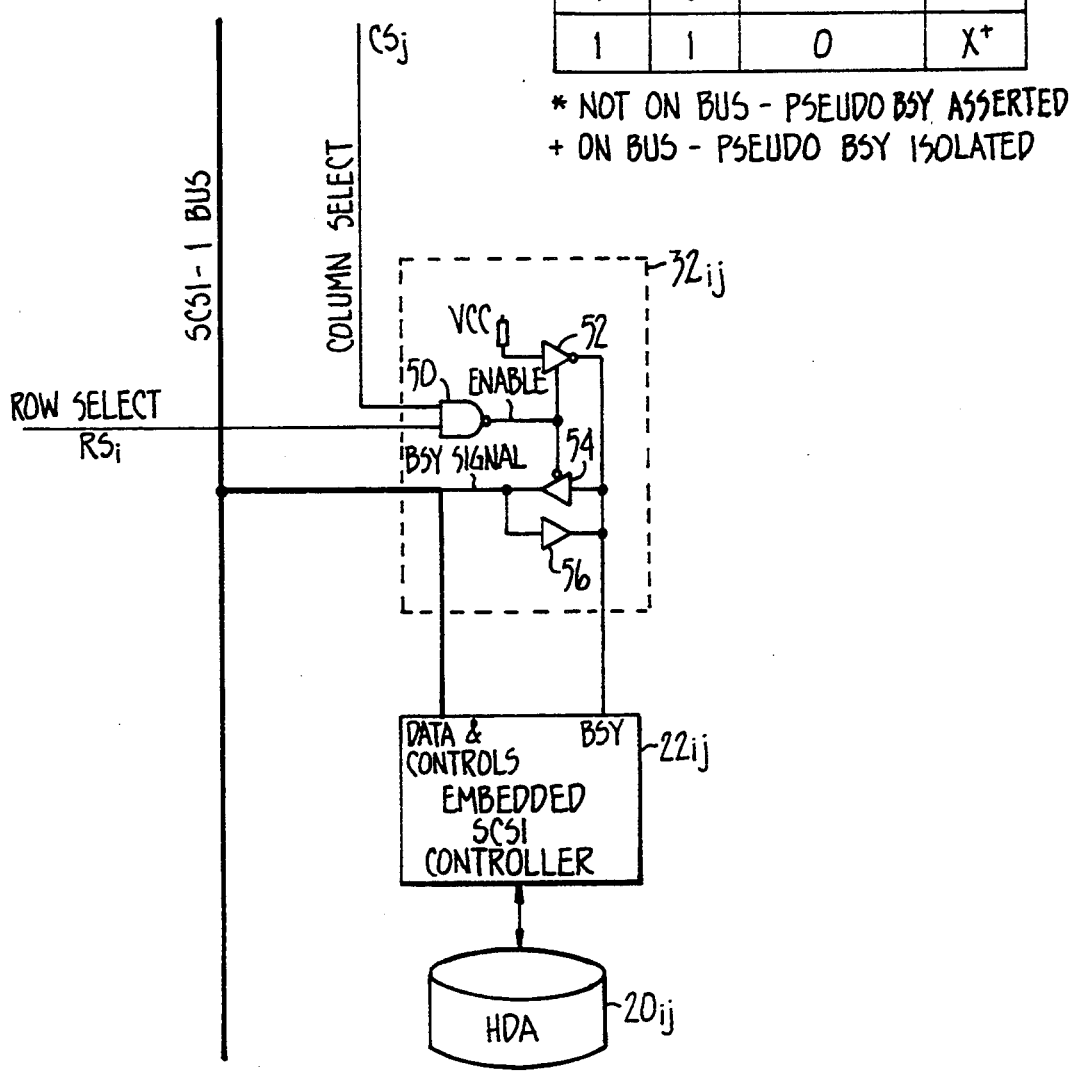
FIG. 3A is a schematic diagram of an implementation for asserting a pseudo busy signal to disk drive units not in a particular desired logical row.
FIG. 3B is a logic diagram showing the use of column select and row select signals in the implementation shown in FIG. 3A thereof.

General Description of Relevant Portions of SCSI Interface

FIG. 1 is a block schematic diagram illustrating an implementation of a parallel array controller ("PAC") 10 to control a matrix configuration of mass storage devices. PAC 10 includes a microprocessor 12 and a plurality of initiators $14_j$ for control over a particular column j, each initiator $14_j$ implementing a common SCSI prioritization protocol to be described below. Each initiator $14_j$ is coupled via a SCSI bus $16_j$ to a plurality of SCSI type storage devices, for example, disk drives $20_{ij}$ logically arranged in rows i and columns j. Initiator $14_j$ controls an exchange of data with its respective disk drives $20_{ij}$ by use of a controller $22_{ij}$, in response to control signals from the microprocessor 12.

Implementation of communication between an initiator $14_j$ and a target, for example disk drive $20_{ij}$, through use of SCSI protocol is controlled by various signals permitting either an initiator $14_j$ or disk drive $20_{ij}$ to control SCSI bus $16_j$ to enter one of a plurality of predetermined phases.

The SCSI architecture includes eight distinct predetermined phases. Each SCSI bus $16_j$ can never be in more than one phase at any given time. These eight phases include:

1. Bus free phase
2. Arbitration phase
3. Selection phase
4. Reselection phase
5. Command phase
6. Data phase*
7. Status phase*
8. Message phase*

*These phases are collectively termed the information transfer phases.

The physical SCSI bus uses a 50 pin connector. There are 8 lines dedicated to data, one line for the busy signal, one line for the select (or reselect) signal, and other control, power and ground lines.

The bus free phase indicates that no SCSI device is actively using a particular SCSI bus $16_j$ and that SCSI bus $16_j$ is available for subsequent users.

The arbitration phase enables a particular SCSI device to gain control of the bus $16_j$ so that it can assume the role of an initiator $14_j$ or a target, here disk drive $20_{ij}$. The procedure by which a SCSI device gains control of a particular SCSI bus $16_j$ is as follows:

1. The particular SCSI device must first wait for the bus free phase to occur.
2. The device must wait a minimum of a predetermined bus free delay after detection of the bus free phase before driving any signal.
3. Following the bus free delay in step 2 above, the device may arbitrate for the SCSI Bus $16_j$ by asserting the BSY signal and its own SCSI identification data bit ("SCSI ID").
4. After waiting at least a predetermined arbitration delay (measured from its assertion of the BSY signal) the device must examine SCSI bus $16_j$. If a higher priority SCSI ID bit is asserted on the data bus (DB 7 is the highest), then the device has lost the arbitration and the device must release its signals and may return to step 1. (Note: In particular implementations, the initiator is established to have the highest priority.) If no higher priority SCSI ID bit is true on the data bus, then the device has won the arbitration and it must assert the SEL signal. Any other device that is participating in the arbitration phase has lost the arbitration and must release its BSY signal and its SCSI ID bit.

The SCSI ID bit is a single bit on the data bus that corresponds to the device's unique SCSI address. All other data bus bits must be released by the device. Therefore, with eight data bits, eight devices may be present on a single SCSI bus $16_j$. In this case, one initiator $14_j$ and up to seven disk drives $20_{ij}$ may be present.

When an initiator $14_j$ is ready to read data from a target, it takes control of SCSI data bus $16_j$ and issues a command to a particular target. The command may be issued to access a particular block of data from a drive, for example. The drive, if the data is not immediately ready, will issue a disconnect command. The disconnect command permits the initiator $14_j$ to issue another command to, or accept data from, another target.

When the particular target is ready, it will wait until it detects a bus free phase. Upon detection of the bus free phase, the particular target will attempt to reselect the initiator $14_j$ which issued the command. The reselection phase is entered after an arbitration has been performed to determine which device, among other possible targets which may have data ready in response to other commands previously issued by the initiator $14_j$, has priority to reselect the initiator $14_j$.

Reselection is subject to a selection/reselection timeout delay of a minimum of 250 milliseconds. This reselection delay is the minimum time that a target will wait for a BSY signal response during reselection before starting a timeout procedure.

A ready device winning the arbitration will attempt to reselect the initiator $14_j$ to satisfy its command. The winning device asserts both BSY and SEL signals and becomes a target by asserting an I/O signal and setting SCSI bus $16_j$ to a value that is the logical sum of its SCSI ID bit and the initiator's SCSI ID bit. An initiator $14_j$ determines that it is being reselected when the SEL and I/O signals and its SCSI ID bit are asserted and the BSY signal is not asserted.

However, the winning device may not be the device with which the initiator $14_j$ would like to exchange data. In this case, the initiator $14_j$ will not respond and the timeout procedure will commence, followed by a bus free phase. During this subsequent bus free phase, ready targets may again arbitrate in an attempt to reselect the initiator.

An inefficient situation exists in the configuration illustrated in FIG. 1 during reselection because each disk drive $20_{ij}$ coupled to a particular initiator $14_j$ will attempt to independently reselect during a bus free phase. If multiple disk drives $20_{ij}$ are attempting to reselect a particular initiator $14_j$, as when multiple operations have been separately initiated, then when an arbitration is recommenced for reselection after a bus free phase, these disks drives $20_{ij}$ will arbitrate for control of SCSI bus $16_j$. The highest priority disk drive $20_{ij}$ arbitrating will win and reselect the initiator $14_j$, irrespective of which disk drive $20_{ij}$ was desired by the initiator $14_j$.

In certain implementations, it is desirable to logically arrange selected ones of disk drives $20_{ij}$ to be connected to one or more of the initiators $14_j$. As illustrated, disk drives $20_{11}$ through $20_{1M}$ are included in logical row 1

("LR$_1$"). Similarly, LR$_N$ also includes a disk drive 20$_{Nj}$ connected to each initiator 14$_1$ through 14$_M$.

In implementing certain data manipulations, it is necessary to simultaneously access an entire logical row LR$_i$, or a particular subset of a particular logical row LR$_i$. As described above, the SCSI protocol does not permit direct addressing of disk drives 20$_{ij}$ during reselection. If data on disk drives 20$_{ij}$ of logical LR$_1$ are desired, each initiator 14$_j$ would have to wait until the desired disk drive 20$_{1j}$ happened to gain access to its particular SCSI bus 16$_j$ before proceeding. Each device attempts to reselect its respective initiator 14$_j$ independently. A disk drive 20$_{i1}$ from any of logical rows LR$_2$ through LR$_N$ may be connected to an initiator 14$_j$ while the other initiators 14$_2$ through 14$_M$ are coupled to disk drives 20$_{1j}$ of LR$_1$. In this situation, when an inappropriate disk drive 20$_{i1}$ has control of data bus 16$_1$, disk drive 20$_{i1}$ will timeout and disconnect as initiator 14$_1$ will not respond. When a subsequent bus free phase is detected, disk drive 20$_{11}$ of LR$_1$ may gain access to the SCSI bus 16$_1$ and communicate with initiator 14$_1$. Since access is controlled by priority during reselection, it may never occur that disk drive 20$_{11}$ reselects initiator 14$_1$ until higher priority disk drives that are ready have been serviced.

It is therefore an object of the present invention to permit the PAC 10 to quickly and efficiently select disk drives 20$_{ij}$ which correspond to a particular group or sub-group of a desired logical row LR.

A Preferred Embodiment With An Array of Disk Drives

FIG. 2 is a schematic block diagram of a preferred embodiment of the present invention. PAC 10 includes the microprocessor 12 and a plurality of initiators 14$_j$ coupled to a column of disk drives 20$_{ij}$. Disk drives 20$_{ij}$ are arranged in a matrix having a plurality of logical rows with each disk drive 20$_{ij}$ controlled by a controller 22$_{ij}$.

A reselection control circuit 30 is provided as part of PAC 10 and is responsive to control signals from microprocessor 12 to enable a set of disk drives 20$_{kj}$ of a particular logical row LR$_K$. In response to control signals from the microprocessor 12, reselection control circuit 30 generates a plurality of row select signals and column select signals. A column select ("CS$_j$") signal and a row select ("RS$_i$") signal are each coupled to a logic circuit 32$_{ij}$ for asserting a pseudo busy signal. Logic circuit 32$_{ij}$ is coupled in turn to each controller 22$_{ij}$ and is responsive to the RS$_1$ and CS$_j$ signals.

In operation, for an access of disk drives 20$_{11}$ and 20$_{12}$ of first logic row LR$_1$, reselection control circuit 30 will assert RS$_1$, CS$_1$ and CS$_2$. Logic circuit 32$_{11}$ and logic circuit 32$_{12}$ will respond to RS$_1$, CS$_1$ and CS$_2$ to permit conventional operation of disk drives 20$_{11}$ and 20$_{12}$. Other logic circuits 32$_{ij}$ will assert a pseudo busy signal to controllers 22$_{ij}$ of disk drives 20$_{ij}$ which will inhibit them from reselecting initiators 14$_j$ of their respective SCSI bus 16$_j$. Only when each disk drive 20$_{11}$ and 20$_{12}$ is ready will the BSY signal be asserted to respective initiators 14$_1$ and 14$_2$. During reselection, when disk drive 20$_{11}$, for example, is ready to reselect its initiator, 14$_{11}$, it detects a bus free phase and asserts the BSY signal for arbitration during reselection. As other disk drives 20$_{ij}$ are provided a pseudo BSY signal they will not attempt to reselect the SCSI bus 16$_j$.

FIG. 3A is a schematic diagram of a logic circuit 32$_{ij}$ of a preferred embodiment of the present invention. Logic circuit 32$_{ij}$ includes a logic gate 50 for producing a complement of a logical AND of row select signal RS$_i$ and column select signal CS$_j$. An output of logic gate 50, an enable signal, is coupled to an enabling input of an inverting tristate driver 52 and to an inverted enabling input of a non-inverting tristate driver 54. A supply voltage V$_{cc}$ is provided as an input to inverting tristate driver 52 having an output coupled to a BSY signal input terminal of controller 22$_{ij}$. An input of non-inverting tristate driver 54 is coupled to the output of inverting tristate driver 52. Non-inverting tristate driver 54 has an output coupled to a BSY signal channel of SCSI bus 16$_j$. A driver 56 has an input coupled to the output of non-inverting tristate driver 54 and an output coupled to the input of noninverting tristate driver 54.

Referring to FIG. 3B, which is a logic diagram showing the use of RS$_i$ and CS$_j$ in logic circuit 32$_{ij}$, in operation, without signals asserted on RS$_i$ and CS$_j$, logic gate 50 normally asserts the enable signal. Assertion of the enable signal indicates that the particular drive 20$_{ij}$ to which it is coupled is not part of a desired logical row LR$_i$ and a pseudo BSY signal should be coupled to controller 22$_{ij}$ at its BSY terminal input. The enable signal provided to inverting tristate driver 52 and non-inverting tristate driver 54 enables inverting tristate driver 52 to assert BSY to the BSY terminal of controller 22$_{ij}$. Similarly, tristate driver 54 is disabled by the enable signal from logic gate 50 and prevents the pseudo BSY signal from manifesting itself on SCSI bus 16$_j$. Driver 56 permits a bona fide BSY signal from SCSI bus 16$_j$ to be coupled directly to the BSY input line of controller 22$_{ij}$ in the event that SCSI bus 16$_j$ is, in fact, busy. The pseudo busy signal remains until both RS$_i$ and CS$_j$ are asserted to logic gate 50 which negates the enable signal. Negation of the enable signal disables inverting tristate driver 52 and enables non-inverting tristate driver 54 for normal operation of controller 22$_{ij}$ with respect to initiator 14$_j$ on SCSI bus 16$_j$.

FIG. 4 is a timing chart illustrating operation of a 2×2 matrix of SCSI type devices. For simplification, the first column of two SCSI type devices will be assumed to be coupled to a first SCSI type bus 16$_1$ and the second column of two SCSI type devices are coupled to a second bus 16$_2$ which have identical timing characteristics. Communication between an initiator and a target is outlined by illustration of a progression of phases of a SCSI type prioritization protocol in column 402, with the vertical axis representing time, starting at the top. First, the initiator waits for a bus free phase when the SCSI bus has BSY inactive to arbitrate. The initiator wins the arbitration ("ARB") because it has the highest priority and asserts a selection ("SEL") to targets on the bus. The targets and the initiator exchange messages ("MSG") and commands ("CMDs") during a period of time indicated by arrow 404. A constant busy assertion is shown for each target during this time for simplicity, although multiple assertions of the busy line will occur. When the desired commands have been exchanged, the targets disconnect at the end of period 404, and the targets perform the task requested (i.e., a disk drive retrieves data). When a target is ready to transmit, it checks its busy channel for BSY, and if a bus free phase is detected reselection as described above is attempted. However, for target$_{2221}$ and target$_{2222}$ a BSY signal will be detected inhibiting their attempts to arbitrate and reselect their respective initiators. The five BSY SIGNAL time lines of FIG. 4 illustrate that target$_{2221}$ and target$_{2222}$ will have a pseudo BSY signal asserted even though each SCSI bus $16_1$ and SCSI bus $16_2$ go inactive after a disconnect command. These pseudo busy signals permit $target_{2211}$ and $target_{2212}$ to detect a bus free phase and reselect their respective initiator without arbitrating against $target_{2221}$ and $target_{2222}$, respectively. This permits the initiator to have access to a particular desired target, irrespective of a prioritization protocol which would grant reselection control to a highest priority device arbitrating.

The disclosed preferred embodiment provides apparatus to select a subset of a particular logical row by use of column select signals. It may be desirable that an entire logical row be chosen and that subsets not be chosen. In this instance, logic gate 50 (FIG. 3A) may be removed and, as there is no longer a need for column select signal $CS_j$, the $RS_i$ signal may be used to enable or disable the tristate drivers 52 and 54. The present invention may also be used to permit a single initiator to determine which of a plurality of SCSI storage devices it controls, by allowing it to reselect the SCSI bus during a bus free phase. The present invention is not limited to selection of storage devices all within the same logical row. It is possible, by use of the present invention to arbitrarily select any row from each column, or to enable multiple storage devices in each column.

The invention has been described by reference to specific embodiments. Other embodiments will be apparent to those of ordinary skill in the art without departing from the spirit of the present invention. For example, a network bus could be used instead of a SCSI bus. The devices on the bus look for the absence of the carrier sense signal before trying to access the bus. Thus, a pseudo carrier sense signal could be generated with appropriate logic to control access to the bus. It is therefore not intended that the invention be limited except as indicated by the appended claims.

What is claimed is:

1. A reselection inhibiter, comprising:
   an initiator;
   a first and a second SCSI type device, each having a busy terminal;
   a bus, having a busy channel, for coupling said initiator to said busy terminal of said first and second SCSI type device;
   a reselection control circuit for asserting a select signal identifying a particular one of said SCSI type devices to be inhibited during reselection; and
   logic means, coupled to said first and second SCSI type device and disposed intermediate said bus and said SCSI type device and responsive to said select signal, for:
      asserting a pseudo busy signal to said busy terminal of only said particular one SCSI type device;
      isolating said pseudo busy signal from said bus; and
      merging a busy signal from said bus to said busy terminal of said particular one SCSI type device.

2. A method of enabling reselection of only a particular one of a plurality of SCSI type devices, comprising the steps of:
   asserting a select signal identifying the particular one SCSI type device to be enabled for reselection;
   decoding said select signal with logic devices for each of the plurality of SCSI type devices to produce an enable signal associated with each of said SCSI type devices;
   determining by said logic devices for each said SCSI type device whether it is said particular one SCSI type device, if it is not said particular one SCSI type device, asserting its said associated enable signal, otherwise negating its said associated enable signal; and
   generating a pseudo busy signal and transmitting said pseudo busy signal to each of said plurality of SCSI type devices whose associated enable signals are asserted.

3. An apparatus for providing a pseudo busy signal to a particular storage device disposed in a logical matrix for inhibiting reselection of the particular storage device of an initiator coupled to the particular storage device by a bus system including a busy channel in response to a first signal and a second signal, comprising:
   logic means, responsive to the first and second signal, for providing an enable signal having a first and a second prespecified condition, said logic means providing said enable signal in said first prespecified condition when the pseudo busy signal is to be asserted;
   means, responsive to said enable signal, for
      asserting said pseudo busy signal to a busy channel of the particular storage device if said enable signal is in said first prespecified condition, otherwise if said enable signal is in said second prespecified condition, said asserting means isolates said pseudo busy signal from said busy channel of said particular storage device; and
      isolating said pseudo busy signal from said bus system if said enable signal is in said first prespecified condition, otherwise, if said enable signal is in said second prespecified condition, coupling said busy channel of said particular storage device to said busy channel of said bus system; and
   means for providing said busy channel of said bus system to said busy channel of said storage device irrespective of a condition of said enable signal.

4. A parallel storage array having a first and a second logical row of a first and a second storage device, each first storage device of each logical row coupled to a first control device by a first plurality of bus lines and each second storage device of each logical row coupled to a second control device by a second plurality of bus lines, each of the disk drives responsive to an assertion of a bus free signal to assert a busy signal at a busy terminal when ready, and each storage device disabled from asserting the busy signal if the busy signal is concurrently asserted at the busy terminal when a respective device is ready to assert its busy signal, comprising:
   a reselection control circuit for selectively asserting a first row select signal to each storage device of the first logical row and a second row select signal to each storage device of the second logical row;
   first means for asserting the busy signal of each storage device of said first logical row if said first row select signal is asserted, otherwise said first asserting means coupling the busy terminal of each storage device of said first logical row to its respective plurality of bus lines; and
   second means for asserting the busy signal of each storage device of said second logical row if said second row select signal is asserted, otherwise said second asserting means coupling the busy terminal of each storage device of said second logical row to its respective plurality of bus lines.

* * * * *